Oct. 30, 1962     K. ZWICK     3,060,813
MACHINE TOOL
Filed Dec. 8, 1959
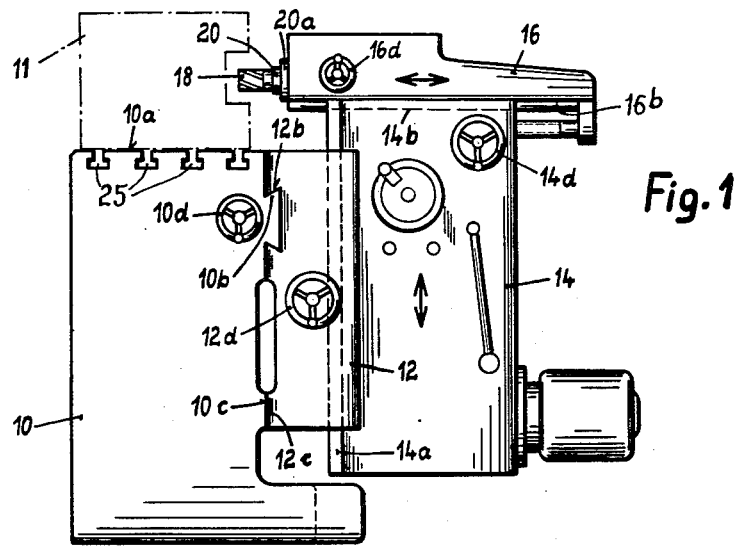
*Fig. 1*
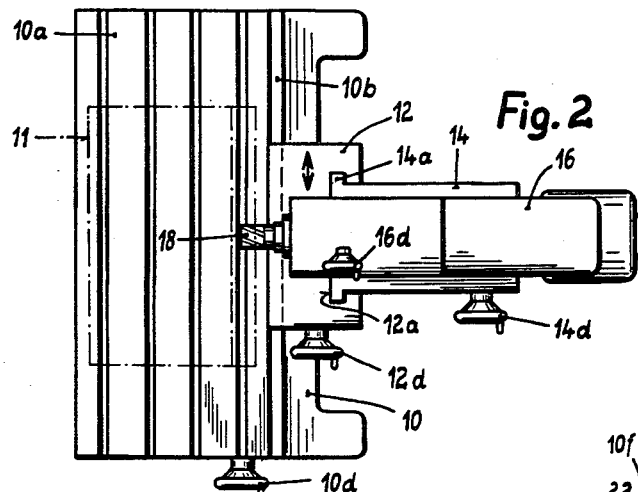
*Fig. 2*
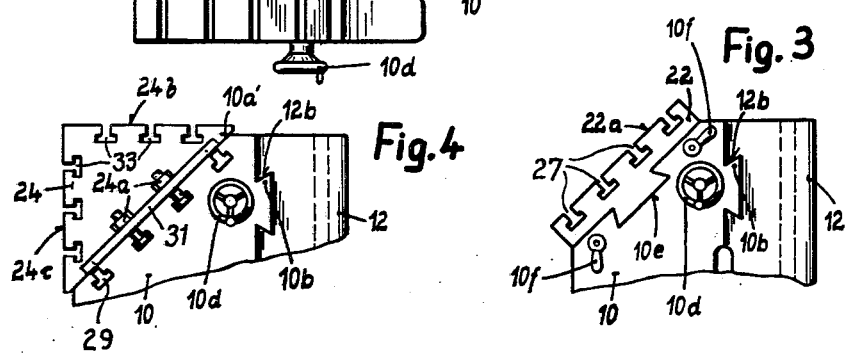
*Fig. 4*     *Fig. 3*

November 30, 1962 — 3,060,813

3,060,813
MACHINE TOOL
Kurt Zwick, Munich, Germany, assignor to Hans Deckel, Munich, Germany, and Friedrich Wilhelm Deckel, Zug, Switzerland
Filed Dec. 8, 1959, Ser. No. 858,157
Claims priority, application Germany Oct. 11, 1957
11 Claims. (Cl. 90—16)

The present invention relates to a machine tool for milling, boring, or the like.

In the most common types of milling machines, the workpiece clamping surface is carried by a work table, which during the preliminary adjustment and also during the progress of the milling operation, is moved in one or more feed directions, either vertical, longitudinal or transverse, or any combination of these. Those adjusting and feeding movements not made by movement of the work table are performed by some other part of the machine, such as the tool support or spindle. The guides on which the work table moves during feeding, in machines of these types, are subjected to greatly varying loads depending on the position and weight of the workpiece. The precision of the guiding, and consequently of the machining, is therefore largely governed by the spatial arrangement of the work table guides on the machine, and on their length. The equipping of machines of the same standard size with work tables of different dimensions, so as to receive oversize workpieces, is disadvantageously limited due to the necessity of avoiding impermissible stressing of the guides. Furthermore, the workpieces when using machines of these types must be displaced during the machining, which is wearisome and cumbersome in the case of heavy workpieces, particularly where the machine is adjusted manually.

An object of the invention is to provide a generally improved and more satisfactory machine tool which avoids the disadvantages referred to.

Another object is the provision of a machine tool so arranged that it is not necessary to move the workpiece during the machining, whereby even heavy workpieces may be fastened to the clamping surface without it being necessary to fear detrimental loads on the guides.

Yet another object is to provide a new and improved milling machine for more accurately machining large workpieces.

A further object is the provision of a new and improved milling machine having a workpiece clamping surface which may be given a coarse adjustment before machining, but which is stationary during the machining so that the guides for the movable parts of the machine may be designed to accept loads which may be determined in advance and which are independent of the size and weight of the workpiece.

These and other desirable objects may be attained in the manner disclosed as an illustrative embodiment of the invention in the following description and in the accompanying drawings forming a part hereof, in which:

FIG. 1 is a side elevational view of a machine tool according to the invention, a workpiece being shown in dotted lines;

FIG. 2 is a top plan view of the machine tool illustrated in FIG. 1;

FIG. 3 is a fragmentary side elevational view of a second embodiment of the invention; and FIG. 4 is a view similar to FIG. 3 of a third embodiment of the invention.

The same reference numerals throughout the several views indicate the same parts.

The machine tool according to the invention will be described with regard to its preferred embodiment as a milling machine. The machine shown in FIGS. 1 and 2 has a solid generally rectangular stand 10, the base of which is adapted to be anchored to the floor. The top of the stand 10 is finished to provide a horizontal workpiece clamping surface 10a, which has a plurality of parallel clamping grooves 25 extending longitudinally or from side to side of the stand 10, while being spaced in a front to rear or transverse direction. The clamping grooves 25 may have any suitable shape, but are preferably inverted T-shaped in cross section as illustrated. A workpiece 11, for instance a cast iron block indicated in dot-dash lines, rests on the clamping surface 10a and is fastened by holding means extending into the clamping grooves 25 in a conventional manner.

The rear vertical side surface of the machine stand 10 has a dovetail guide 10b extending in a horizontal direction from side to side. An upright carriage 12 has a corresponding horizontal guide groove 12b engaged with the dovetail guide 10b whereby the carriage 12 is displaceable in a horizontal direction relative to the stationary stand 10. Below the guide 10b on the stand 10 is a vertical bearing surface 10c, also extending horizontally, which is in sliding engagement with a mating vertical bearing surface 12c on the carriage 12. By this arrangement, the torsional moments occurring in the guiding of the carriage 12 can be taken up. Horizontal feeding movement of the carriage 12 may be mechanically controlled in known manner, and in addition a handwheel 10d is provided for a manual setting of the carriage 12 on the machine stand 10.

The rear portion of the carriage 12 has a T-shaped vertically extending guide slot 12a in which is slidably received a corresponding guide 14a on a gear case 14, the gear case 14 projecting rearwardly from the carriage 12 to be supported entirely thereby. The gear case 14 contains the usual drive control and switch means of known type, which need not be described in detail, and is adjustable in a vertical direction relative to the carriage 12.

The top of the gear case 14 extends above the carriage 12 and has a horizontal dovetail guide 14b extending from front to rear, at right angles to the guides 10b and 12b. A tool support, preferably taking the form of a spindle pedestal 16, is slidably mounted on the top of the gear case 14 and has depending dovetail guides 16b engaged in the previously mentioned guide 14b, whereby the spindle pedestal is displaceable in a horizontal direction relative to the gear case 14.

The spindle pedestal 16 supports a forwardly projecting spindle 20 which bears the tool, for instance a miller 18. The spindle 20 is driven by gear means of known type which are arranged in the gear case 14 and in the spindle pedestal 16. The spindle 20 is preferably arranged in the spindle pedestal 16 so that it can be removed, together with its bearing sleeve 20a, in a forward direction extending parallel to the direction of displacement of the spindle pedestal 16.

It can be seen that the tool 18 may be displaced in three mutually perpendicular directions, sometimes referred to as three coordinate directions. Feeding in a front to rear direction is achieved by displacement of the spindle pedestal 16 relative to the gear case 14, feeding in a vertical direction is achieved by displacing the gear case 14 relative to the carriage 12, and feeding in a side to side direction is achieved by displacing the carriage 12 relative to the stationary stand 10. During a milling or other cutting operation performed on the workpiece, the workpiece itself remains stationary, and all of the feeding movements of the tool relative to the work are performed by movement of one or another of the parts 12, 14, and 16 on their respective guides, or movement of the tool spindle 18 relative to the part 16. Thus the forces acting on these guides, which may cause deflection in the guides, are independent of the weight and location of the workpiece, and are dependent only on the substantially constant weight of the parts 12, 14, 16, etc., and on the feeding forces, all of which, being known in advance, can be adequately allowed for in the design of the machine. This eliminates the inaccuracies in conventional machine tools, caused by subjecting the feeding guides to variable deflection as a result of variable weight of the workpiece.

The feed and in-feed movements of the different machine parts are mechanically controlled in known manner. Furthermore, manual setting may also be accomplished, by a handwheel 12d for the vertical displacement of the gear case 14 with respect to the carriage 12, a handwheel 14d for the displacement of the spindle pedestal 16 with respect to the gear case 14, and a handwheel 16d for displacing the tool spindle 20 with respect to the spindle pedestal 16.

The clamping surface for the workpiece need not be formed directly on the machine stand 10, as is the clamping surface 10a in the embodiment of FIG. 1. In a second embodiment of the invention illustrated in FIG. 3, the upper surface of the machine stand 10 is inclined downwardly and forwardly at an invariable angle of preferably 45 degrees and has a horizontal dovetail guide 10e extending parallel to the guide 10b. A separate clamping table 22 is slidably mounted on the upper inclined surface of the stand 10 for displacement in a horizontal direction by means of a mating depending dovetail guide engaged in the guide 10e. The clamping surface 22a of the table 22 is likewise inclined downwardly and forwardly parallel to the upper surface of the stand 10 and is provided with the plurality of T-shaped clamping grooves 27 extending in a horizontal direction and spaced laterally.

The clamping table 22 is displaceable in a side to side direction relative to the stationary machine stand 10 to provide a coarse adjustment of the workpiece supported thereon, normally made prior to the adjustment of the tool 18 as previously described. The plate 22 may be held fast to the machine stand 10 by known clamping devices, not here shown, levers 10f being provided for the actuation of the clamping devices. It should be emphasized that the movement of the table 22 on the stationary support 10 is only for the preliminary adjustment of the work prior to the milling or other operation to be performed. During the milling or other operation, the table 22 is firmly clamped, and the workpiece remains stationary in this embodiment of the invention, as in the other embodiments.

The advantages of providing an inclined clamping table 22 having an inclined clamping surface 22a are more fully explained in the copending patent application of K. Zwick, Serial No. 765,571, filed October 6, 1958 (now abandoned and replaced by a continuation-in-part application filed June 9, 1960, Serial No. 36,109). The present application is a continuation-in-part of said application 765,571. In case the workpiece is mounted directly in the clamping grooves 27, the workpiece has a coarse adjustment before machining not only in the side to side direction, by moving the clamping table 22, but also in a vertical and front to rear direction. This is because the workpiece may be mounted in any desired set of clamping grooves 27, use of an upper set of grooves mounting the workpiece at a higher elevation and more to the rear than if a lower set of grooves are used. Additionally, the workpiece may be mounted on a prismatic clamping attachment or adapter removably secured to the clamping table 22, such as the clamping attachment 40 described in the aforementioned copending patent application or the clamping attachment 24 to be presently described.

The inclined mounting of the clamping table 22 on the machine stand 10 is especially advantageous as compared to a conventionally mounted horizontal or vertical table.

The weight of the workpiece and of the table 22 has a component which is directed downwardly parallel to the inclined surface of the machine stand 10, so that the lower portion of the dovetail guide 10e on the stand 10 and the mating guide on the table 22 engage firmly. There is consequently no disalinement of the table in its guides, such as might occur in the case of a horizontally arranged table. The weight of the table 22 and of the workpiece also causes the table to be pressed against the upper surface of the stand 10 in a direction perpendicular to the plane of the table, whereas in the case of a vertically arranged table this weight exerts on the table a torque tending to force the table out of its upper guides. It is possible to make the inclined table 22 with a larger surface area than in the case of a horizontal table arrangement, within a given area of floor space. This larger table area makes the moment of inertia of the table greater, and thereby minimizes the vibration of the table and workpiece during machining.

In FIG. 4 is shown another embodiment of the invention, in which the upper surface 10a of the machine stand 10 is inclined downwardly and forwardly preferably at an angle of 45 degrees, in the same manner as in FIG. 3, except that no separate carriage or table like the table 22 is provided in this embodiment. Instead, the inclined clamping surface 10a' is provided with a plurality of T-shaped clamping grooves 29 formed in the stationary machine stand 10 and extending in a horizontal direction and spaced from another in a transverse direction. A workpiece may, if desired, be clamped directly in the grooves 29, however it is preferable to provide a clamping attachment or adapter 24 having substantially horizontal and vertical clamping surfaces. The clamping attachment 24 preferably takes the form of an elongated triangular prism having a length shorter than that of the stand 10, and is clamped to the upper inclined surface 10a' along its hypotenuse. As the triangular cross section of the prism desirably is an isosceles triangle having 45 degree angles, there are provided a substantially horizontal clamping surface 24b and a substantially vertical clamping surface 24c.

The clamping attachment 24 has at each end, along its hypotenuse, a pair of flange extensions 31, each of which has one or more elongated slots through which extends one or more clamping screws 24a each having an enlarged head engaged in one of the clamping grooves or slots 29 in the inclined stand surface 10a'. Preferably each end of the prismatic clamping attachment 24 is fastened by at least two of the clamping screws 24a, one engaged in one of the clamping slots 29 and one in another of the clamping slots. The clamping attachment 24 may be mounted in any selected pair of clamping grooves 31. Extending from end to end in the horizontal top surface 24b of the clamping attachment are a plurality of spaced, parallel T-shaped clamping grooves or slots 33. Similarly disposed along the vertical surface 24c are a plurality of the spaced, parallel clamping grooves 33. Although not here illustrated, a workpiece may be detachably secured to the clamping attachment 24 by suitable clamps attached to the workpiece and engaging one or more of the grooves 33. Since any one or more of the grooves 33 may be utilized, great versatility is allowed in providing a coarse adjustment of the workpiece prior to the adjustment of the tool 18.

It will be understood that the stand 10 and carriage 12 illustrated fragmentarily in FIGS. 3 and 4 are identical to the corresponding parts in the embodiment of FIG. 1, and are associated with a gear case 14 and a spindle pedestal 16 in the same manner. The operation of these corresponding parts is as previously described.

With the type of machine tool according to the invention, it is not necessay to move the workpiece during the machining as it lies on the immovable rigid clamping surface of the machine stand 10. Accordingly, even very heavy workpieces may be fastened on the clamping surface without having to consider detrimental loads on the guides for the displaceable carriage 12, gear case 14, and tool support 16. The feed and in-feed movements of the tool 18 with respect to the workpiece are independent of the weight of the workpiece. The weight of the vertically adjustable gear case 14 and of the displaceable spindle pedestal 16 arranged thereon is practically constant and thus gives, considering the maximum permissible forces which can be determined in advance, a load which can be clearly determined and taken into consideration. The torsional movements which occur in the guides 10b, 12b of the carriage 12 are taken up without difficulty by the additional bearing surfaces 10c, 12c on the carriage and machine stand 10. Furthermore. the construction according to the invention is arranged so that the horizontal guiding of the carriage on the machine stand can be made so long that the vertical guiding of the gear case 14 and accordingly also of the axis of the tool 18 lies, in any desired position of the carriage 12, within the region of the horizontal guide surfaces of the machine stand 10. An excess lateral twisting movement caused by the machine parts protruding freely from the guide does not occur here.

Within the scope of the invention, other forms of the machine tool described in the preferred embodiment as a known machine may be developed. For instance, a boring or grinding head may be mounted on the spindle pedestal 16, so that boring and grinding work may also be carried out on the machine tool according to the invention. Thus the machine may be described as a universal milling machine, which is an expression used in the art to describe a machine tool which is basically a milling machine but which may be used for other types of operations by mounting a boring attachment, grinding attachment, or other conventional known form of attachment on the machine. It is with such a universal type of machine that the present invention of the inclined work table is especially useful, because the work piece may be mounted as far down the incline or slope of the work table or clamping surface as may be necessary in order to get the top of the work piece at an elevation below the tool spindle of whatever attachment may be mounted on the basic machine, yet may be mounted as far up the slope or incline of the work table or clamping surface as may be permitted by the size and shape of the work piece, thereby bringing the work piece as close as possible to the gear case and minimizing the necessary forward overhang of the spindle pedestal or headstock from the gear case. The invention may also be applied to copying and engraving machines.

What is claimed is:

1. A machine tool of the "universal milling machine" type, comprising a rigid stationary machine stand having an upper workpiece supporting surface inclined downwardly from rear to front, said stand also having an upright rear face provided with horizontally extending guides, a carriage slidably mounted on said guides for displacement in a horizontal direction, a gear case slidably mounted on said carriage for vertical displacement, said gear case rising behind said machine stand to an elevation substantially higher than the top of said stand, a tool support slidably mounted on said gear case for horizontal displacement substantially perpendicular to the direction of displacement of said carriage, and means for clamping a workpiece in a stationary position supported by said inclined supporting surface, so that a workpiece may be mounted in a position higher up said inclined surface and further toward the rear or further down said inclined surface and further toward the front, depending upon the size and shape of the workpiece and the desired proximity to a tool carried by said tool support, and so that a desired machining operation on said workpiece may be carried out by movement of said tool in three coordinate directions while said workpiece remains completely stationary.

2. A construction as defined in claim 1, wherein said means for clamping a workpiece in stationary position comprises clamping slots formed directly in said inclined surface of said stationary machine stand.

3. A construction as defined in claim 1, wherein said means for clamping a workpiece in stationary position comprises a clamping table slidably mounted on said inclined upper surface of said stationary machine stand, said clamping table having an upper surface also inclined downwardly from rear to front at an invariable angle, means for securing said table in fixed rigid position on said machine stand during a milling operation, and clamping slots formed in said inclined upper surface of said clamping table for securing a workpiece thereto.

4. A machine tool comprising a stationary machine stand having an upper surface slanting downwardly and forwardly at an invariable inclination to a horizontal plane, means carried by said upper slanting surface for supporting a workpiece, said machine stand also having horizontally extending guides on a rear vertical side surface thereof, a carriage mounted on said guides for displacement in a horizontal direction, a gear case slidably mounted on said carriage for vertical displacement, and a tool support slidably mounted on said gear case for horizontal displacement substantially perpendicular to the direction of displacement of said carriage.

5. A construction as defined in claim 4, wherein said means for supporting a workpiece comprises a clamping table, and interengaging guides for adjustably mounting said table on said machine stand for side-to-side displacement, said table having a workpiece clamping surface inclined downwardly and forwardly parallel to said upper slanting surface on said machine stand.

6. A construction as defined in claim 4, wherein said means for supporting a workpiece includes a triangular clamping attachment, and means for securing said clamping attachment to said upper slanting surface of said machine stand so as to provide a vertical and a horizontal clamping surface.

7. A machine tool of the type having a workpiece support inclined downwardly and forwardly at an invariable inclination of substantial extent to a horizontal plane passing through the top edge of said support, characterized by a stationary machine stand for holding said workpiece support in stationary position during a machining operation, a horizontal guideway on said stationary stand on a vertical surface thereof adjacent and substantially parallel to said top edge of said inclined support, a machining tool for operating on a workpiece supported from said inclined support, means for supporting said tool from said guideway for bodily movement along said guideway and for movement in at least one direction transverse to said guideway, and means for imparting to said tool a feeding movement relative to said stationary machine stand, so that said tool may operate upon and perform a feeding movement relative to a workpiece entirely by movement of said tool relative to said stationary machine stand while the workpiece is fixed in stationary position relative to said stationary machine stand.

8. A construction as defined in claim 7, in which said support is inclined at substantially 45 degrees to said horizontal plane, further including a prismatic intermediate element interposed between said inclined support and the workpiece, said prismatic element being clamped in fixed position on said inclined support during a machining operation and said workpiece being clamped in fixed position on said prismatic element.

9. A machine tool of the "universal milling machine" type, comprising a rigid immovable base portion of limited height over which a work piece is to be positioned, and tool supporting means rising upwardly behind said base portion to a height substantially higher than the highest point of said base portion, said tool supporting means including a support member having a vertical guideway, a gear case movable upwardly and downwardly on said vertical guideway, and a tool mounting head supported from said gear case and movable horizontally relative to said gear case, characterized by the fact that there is a clamping surface supported at an invariable height by said immovable base portion, said clamping surface being inclined forwardly and downwardly away from said upwardly rising tool supporting means at a constant invariable angle of approximately 45 degrees to the horizontal, a work mounting adapter of angular cross section having a lower face clamped to said clamping surface and an upper face rigidly fixed with respect to said lower face at such angle to the lower face that the upper face of the adapter will be horizontal when the lower face is clamped to said inclined clamping surface, the horizontal upper face of the adapter being adapted to receive and support a work piece in position to be machined by a tool held by said tool supporting means, and means for rigidly clamping said adapter in various positions up or down the slope of said inclined clamping surface, depending upon the size and shape of the work piece, the adapter and the work piece remaining at an invariable elevation during any given machining operation, vertical machining movement being possible by vertical movement of said gear case on said vertical guideway without changing the elevation of the work piece relative to said rigid immovable base portion.

10. A construction as defined in claim 9, in which said inclined clamping surface is formed directly on and as a part of said rigid immovable base portion.

11. A construction as defined in claim 9, in which said inclined clamping surface is formed on a slide movable horizontally, without change in elevation, on said rigid immovable base portion.

References Cited in the file of this patent
UNITED STATES PATENTS

| | | |
|---|---|---|
| 110,609 | Van Haagen | Dec. 27, 1870 |
| 427,091 | Landis | May 6, 1890 |
| 2,052,271 | Archea | Aug. 25, 1936 |
| 2,221,638 | Indge | Nov. 12, 1940 |
| 2,406,009 | Forster | Aug. 20, 1946 |
| 2,890,628 | Jouachim | June 16, 1959 |

FOREIGN PATENTS

| | | |
|---|---|---|
| 330,579 | Switzerland | July 31, 1958 |
| 370,754 | Germany | Jan. 7, 1922 |